Feb. 27, 1934.　　　J. C. BOHMKER　　　1,948,559
ELECTRICAL RELEASE FOR PLANTERS
Filed Sept. 14, 1931　　　4 Sheets-Sheet 1

Inventor:
John C. Bohmker.
By John P. Smith
Atty.

Feb. 27, 1934. J. C. BOHMKER 1,948,559
ELECTRICAL RELEASE FOR PLANTERS
Filed Sept. 14, 1931 4 Sheets-Sheet 2

Inventor:
John C. Bohmker.
By John P. Smith
Atty.

Feb. 27, 1934.  J. C. BOHMKER  1,948,559
ELECTRICAL RELEASE FOR PLANTERS
Filed Sept. 14, 1931   4 Sheets-Sheet 3
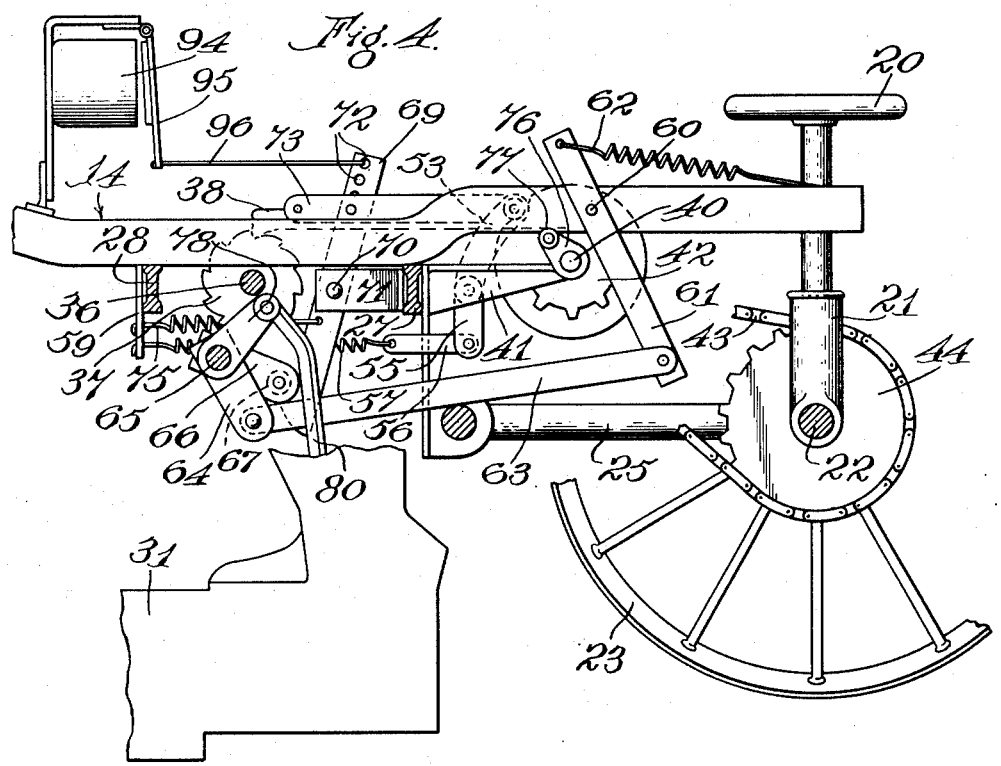
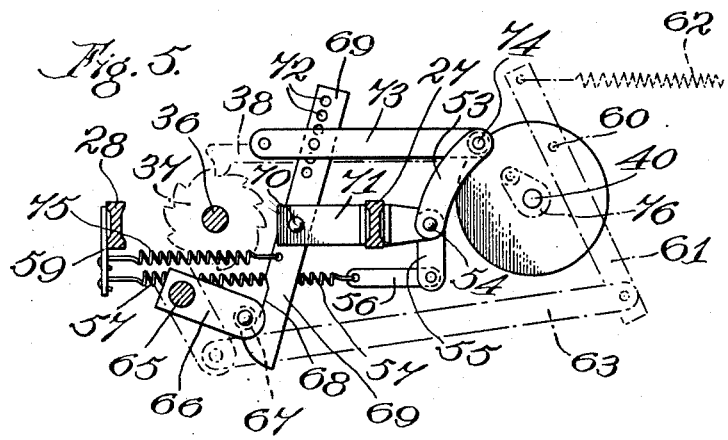
Inventor:
John C. Bohmker.
By John P. Smith
Atty.

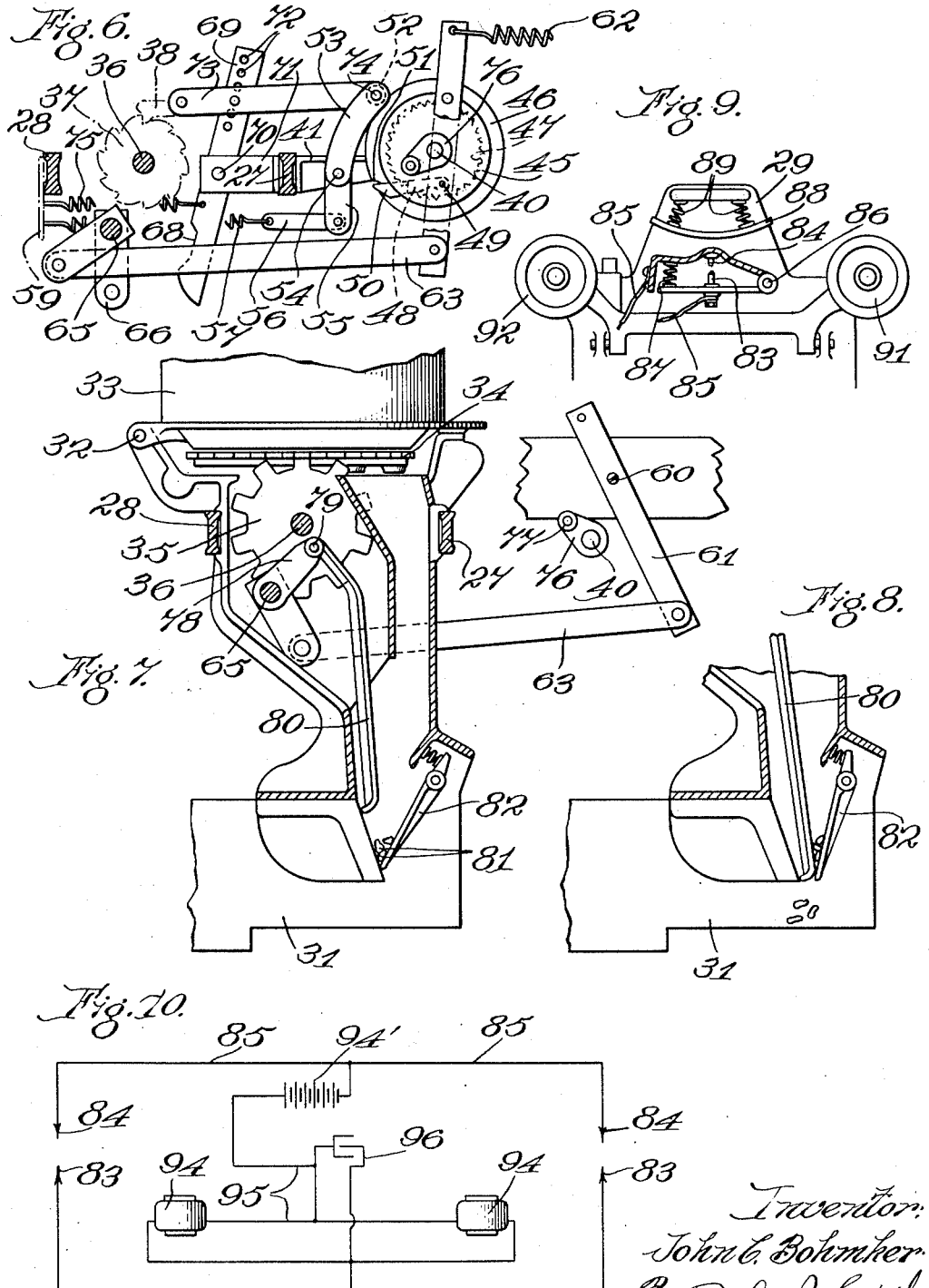

Patented Feb. 27, 1934

1,948,559

UNITED STATES PATENT OFFICE 1,948,559

ELECTRICAL RELEASE FOR PLANTERS

John C. Bohmker, Kankakee, Ill.

Application September 14, 1931
Serial No. 562,612

13 Claims. (Cl. 111—38)

The invention relates generally to planters, but more particularly to electrically operated mechanism for securing a simultaneous planting of a plurality of planting mechanisms so that the seeds planted thereby will be arranged in transverse alignment or in cross rows.

A still further object of the invention is to provide a novel and improved electrically operated planting mechanism more especially adapted for "check" row planting so as to insure an accurate means of depositing the seed in transverse alignment for cultivating purposes.

With the mechanically operated planting mechanism heretofore used in which a plurality of planting mechanisms are supposed to simultaneously plant a plurality of hills at one time, considerable difficulty has been experienced in securing a transverse or cross row alignment of the hills on account of the looseness of play in the operating parts which operatively connect the plurality of planting mechanisms together. It is therefore the primary object of the present invention to provide a novel and improved electrically operated release which positively insures a simultaneous release and which positively plants or drops the seed at the same instant so as to insure a transverse alignment or straight cross rows of the seed hills.

These and other objects are accomplished by providing a construction and arrangement of the various parts in the manner hereinafter described and particularly pointed out in the appended claims.

Referring to the drawings:

Fig. 4 is a fragmentary side elevational view of the release mechanism with certain parts thereof shown in cross section;

Fig. 5 is a side elevational view of the planter release mechanism with certain parts thereof shown in cross section. The positions shown in Fig. 4 and Fig. 5 are the positions the releasing mechanism assumes just prior to being tripped;

Fig. 6 is a fragmentary side elevational view showing the releasing mechanism after the same has been tripped;

Fig. 7 is a fragmentary side elevational view of the seeding and dropping mechanism with parts thereof shown in cross section;

Fig. 8 is a fragmentary side elevational view partly in cross section of the kernel or seed ejecting mechanism;

Fig. 9 is a fragmentary side elevational view of the contacting mechanism for closing the circuit by the check wire; and Fig. 10 is a diagrammatic view showing the wiring arrangement for simultaneously releasing the planting mechanism.

Figure 1:
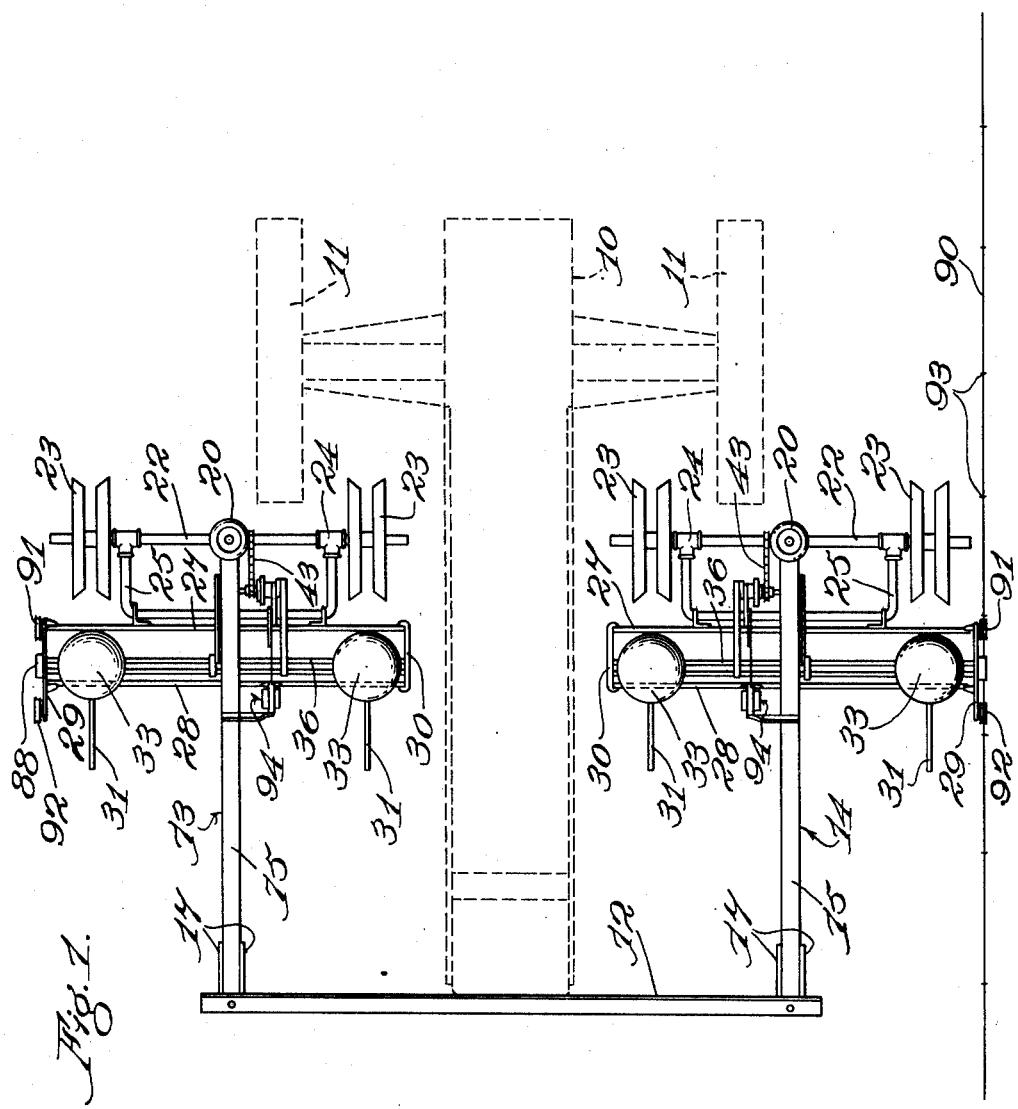
Fig. 1 is a top plan view of a general purpose tractor shown in broken lines, in which a planter unit having two sets of planting mechanisms is attached to a transverse beam at the opposite sides of the tractor.
Figure 2:
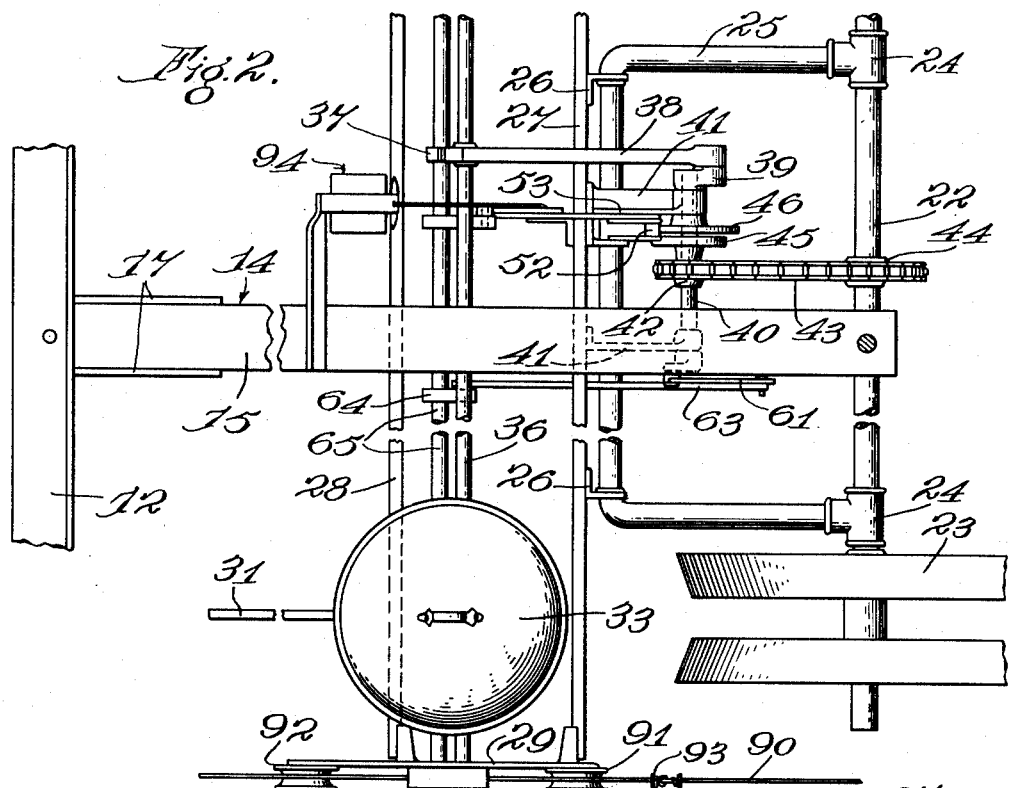
Fig. 2 is a top plan view of a portion of one of the planter sets shown in Fig. 1 of the drawings.
Figure 3:
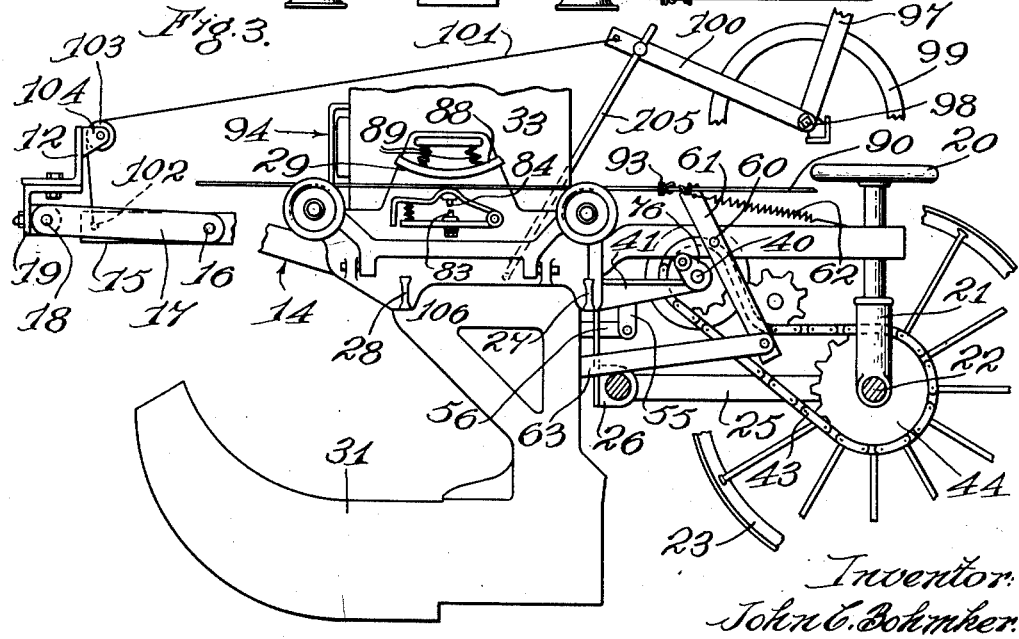
Fig. 3 is a side elevational view of the same.

In illustrating one form of my invention, I have shown the same in connection with a conventional form of general purpose tractor generally indicated by the reference character 10, which in turn is provided with the usual spaced apart rear traction wheels 11 and narrow tread front steering means of any well known form. Secured to the forward end of the tractor frame in any well known manner is a transverse implement supporting beam or angle member 12. Secured to the transverse beam 12 and located on the opposite sides of the tractor are two sets of planting units generally indicated by the reference characters 13 and 14. Any number of these planter sets or individual planting units may be connected to the transverse beam in proper spaced relation with respect to each other and the release means of each unit in a single circuit to simultaneously release the planting mechanism for dropping the seed in transverse or cross row alignment. But, for the purpose of this description, I have chosen to select the conventional two row planter with each planter located on the opposite sides of the tractor in proper spaced relation with respect to each other. A description of one of these planters will suffice for the other.

Each of the planter sets is provided with a pole or tongue 15 which has its forward end pivoted as shown at 16 to two oppositely disposed traps 17 which in turn have their forward ends pivoted at 18 to an angle bracket 19 secured to the lower side of the transverse beam 12. The rear end of the tongue or pole is adjustably connected by means of a hand screw 20 which in turn has its lower end mounted in threaded engagement in a bracket 21. The lower end of the bracket 21 is journaled on the supporting shaft 22. Secured to the outer ends of the shaft 22 is the usual press or cover wheels 23. The shaft 22 is journaled in suitable bearings 24 which in turn are secured to a bail member 25. The forward end of the bail member is pivoted in brackets 26 secured to a rear transverse frame member 27. Located forwardly of the transverse frame member 27 is a forward transverse frame member 28. Each of the planter sets 13 and 14 are provided on their outer sides with a check wire bracket 29 which are secured to each of the transverse frame members 27 and 28, while the inner ends of these frame members of each of the sets are secured by a longitudinally extending bar 30. (See Fig. 1.) Secured between the transverse frame members 27 and 28 in the manner well understood in the art are planter shoes 31. These planter shoes are properly spaced apart and are in alignment in advance of each of the press wheels 23. Secured above each of the shoes 31 and pivoted as shown at 32 are the usual seed cans 33. Rotatably mounted in the bottom of the seed can is the usual seed plate 34 which is operatively driven by a star wheel 35. The star wheel 35 is secured to a shaft 36 which in turn is journaled in the opposite sides of the planter shoes 31. Secured to the shaft 36 on one side of the tongue 15 is a ratchet wheel 37 which in turn is operatively driven by a reciprocating pusher bar 38. The rear end of the pusher bar 38 is operatively driven by a crank 39 which in turn is secured to the clutch shaft 40. The clutch shaft 40 is journaled in suitable brackets 41 which in turn have their forward ends secured to the transverse frame member 27. Journaled on the shaft 40 is a sprocket 42 which is operatively driven by a chain 43 trained about a drive sprocket 44 secured to the rear drive shaft or axle 22. Formed integrally with the sprocket 42 is a continuously driven disc or clutch member 45. Cooperating with the continuously driven clutch member 45 is an intermittently driven clutch member or disc 46. The clutch member 45 is provided with internal ratchet teeth 47 which in turn are adapted to cooperate with a pawl 48 pivoted at 49 to the intermittenly rotating clutch member 46. The pawl 48 is normally pressed into engagement with the ratchet teeth 47 by a spring in any convenient manner. Formed integrally with the dog 48 and offset with respect thereto is an extension or outwardly projecting pointed portion 50 which is adapted to project into a position alongside of a cutout or circular recess 51 formed in the periphery of the intermittently rotating clutch member or disc 46. The intermittently rotating clutch member 46 is stopped at its home position or normally inoperative position by a roller 52 which is adapted to be seated in the recess 51 of the clutch member 46. At the time the roller 52 seats itself in the recess 51, it moves into the path of the pointed end 50 of the pawl 48 to disengage the pawl 48 from the ratchet teeth of the continuously driven clutch member 45. The roller 52 is journaled in the upper end of the curved lever 53 and has an intermediate portion as shown at 54 pivoted to the bracket 41. The lower end of the lever 53 is provided with a downwardly projecting arm 55 which is connected by means of a link 56 to an extension spring 57. The forward end of the extension spring is connected to a bracket 59 secured to the front transverse frame member 28. Pivoted to one side of the tongue 15, as shown at 60, is a lever 61, the upper end of which is connected by a spring 62 for normally returning the upper end thereof rearwardly and the lower end thereof forwardly. The lower end of the lever is connected by means of a link 63 to a crank arm 64. The crank arm 64 is connected to a shaft 65. Secured to the shaft 65 adjacent the crank arm 64 is a second crank arm 66, the free end of which is provided with a roller 67 which is adapted to be seated and engage a recess 68 formed in the lower end of the lever 69. The lever 69 is pivoted intermediate its ends, as shown at 70, to a bracket 71 secured to the rear transverse frame member 27. The upper or free end of the lever 69 is provided with a plurality of apertures 72, in one of which a link 73 is pivotally connected adjacent one end thereof while the rear end of the link 73 is pivotally connected at 74 to the lever 53. The lower end of the lever 69 is normally pulled forwardly by an extension spring 75 which has one end thereof connected to the lever 69 and the other end thereof connected to the bracket 59. The tripping or releasing mechanism is normally returned from the position shown in Fig. 6 to the position shown in Fig. 4, by means of a crank arm 76 which is secured to the clutch shaft 40 and has its free end provided with a roller 77. This roller 77 is adapted to engage the forward edge of the lever 61 during its cycle of operation for returning the lever from its position shown in Fig. 6 to that shown in Fig. 4, at which time it swings the link 63 rearwardly, which in turn swings the crank arms 64 and 66 rearwardly and upwardly until the roller 67 engages the recess 68 in the lever 69. At this moment the roller 52 on the lever 53 engages the peripheral recess 51 in the intermittently rotating disc member 46. Secured to the shaft 65 within the shoe housing is a normally rearwardly and upwardly extending arm 78 which has its free end, as shown at 79, connected to a downwardly extending force feed arm 80. The force feed arm 80 is adapted to move downwardly to engage and force the kernels 81 lying on the pivoted valve 82 to be discharged from within the shoe of the planter as clearly shown in Fig. 7 and Fig. 8 of the drawings.

The essential feature of the present invention involves an electrical circuit including electromagnets or solenoids which operatively control the release of the two planting sets on the opposite sides of the tractor so as to simultaneously release them. This mechanism includes two electrical contact members 83 and 84 which are connected by suitable wires 85 in the circuit hereinafter described. The upper contact member is pivotally connected, as shown at 86, and are normally held out of contact with respect to each other by means of a compression spring 87 interposed therebetween. Positioned above the contact member 84 is a curved spring pressure plate 88 which is normally pressed downwardly by two compression springs 89. As check wire 90 is guided over the sheaves 91 and 92, the buttons 93 provided at proper spaced relation in the check wire 90 will normally depress the upper contact member 84 into contacting relation with the lower contact member 83 to close the circuit. Upon the closing of the circuit, both electrical magnets generally indicated by the reference character 94 will be energized, thereby closing the pivoted armature 95 which has its lower or free end connected by means of a cord 96 to the upper end of the lever 69, thus swinging the lever forwardly and releasing the lower end of the lever from the roller 67 on the outer or free end of the arm 66. At the same time, the movement of the lever 69 forwardly releases the roller 52 from its recess 51 in the intermittently rotating clutch member 46. When the roller 52 is released from the recess 51 the pointed end 50 of the pawl 48 is permitted to move outwardly so that the pawl 48 engages the ratchet teeth 47 of the continuously rotating clutch member 45, thereby permitting the clutch shaft 40 to rotate, which in turn through its connection 38 with the ratchet wheel 37, the shaft 36 is rotated, which in turn rotates the star wheel 35 and the seed plate 34. Simultaneously with the release of roller 67 on the free end of the arm 66 from its locking notch 68 on the lower end of the lever 69, the arm 64 swings forwardly with the shaft 65 by reason of the spring 62 exerting a rearward pull on the upper end of the lever 61 through its connection 63 to the arm 64. The oscillating motion of the shaft 65 also swings the arm 78 downwardly, which in turn actuates the force feed arm 80 to which it is connected downwardly, to open the valve 82 and force the kernels 81 downwardly to be discharged at the rear end of the planter shoe.

In Fig. 10 of the drawings, I have shown a diagrammatic view of the circuit in which the electrically operated release of the separate planting sets are connected together for simultaneously controlling the same. This circuit includes the source of electrical energy such as a battery, indicated by the reference character 94', which may be a separate battery or the battery of the tractor or generator to which the implements are attached. One terminal of the battery is connected to the contact members 84 through the wiring connections 85. The other terminal of the battery is connected by wire 95 to each of the solenoids. The other terminals of the solenoids 94 are connected as shown at 95 to the other contact members 83. Interposed in the circuit between the battery and the solenoids and one of the contacting members is a condenser generally indicated by the reference character 96. It will of course be understood that a check wire bracket is located on the outer side of each planter set and the guide rollers 91 and 92 together with the proper contacters 83 and 84 are associated with each of these brackets so that the wire may be placed in either side when the planters are travelling in the different direction in the field.

From the above description it will be readily seen from the wiring diagram shown in Fig. 10 of the drawings, that as the buttons 93 of the check wire 90 pass under the yielding guide or shield 88 of either check wire brackets, the contacting members 83 and 84 will be brought into contacting relation closing the circuit, thereby instantaneously energizing the electro-magnets 94 of each planter set and actuating the releasing mechanism in the manner above described to simultaneously plant the seed in transverse alignment.

The planting sets on the opposite sides of the tractor may be vertically adusted from their lower or operative positions to their upper or inoperative positions by means of a hand operated lever 97 which is pivoted at 98 to one side of the tractor and is adapted to be locked in a detent 99 in the manner well understood in the art. Secured to the lever 97 is a forwardly projecting arm 100, which in turn, is connected by means of a cable 101 to the forward end, as shown at 102, of the tongue 15. The forward end of the cable 101 is trained about a pulley 103 which in turn is journaled in a bracket 104 secured to the rear side of the transverse angle member 12. The lever arm 100 is connected by means of a rod 105 to the inner planter shoe as shown at 106.

From the above description it will be readily seen that as the lever 97 is manipulated, the planting shoes of one set may be elevated or depressed to the desired position. It will be understood of course, that a raising and lowering mechanism of the above description is located on each side of the tractor.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. The combination with a plurality of planter units, each planting unit being provided with seed planting mechanisms, and check wire operated electrically controlled means for releasing all of said planting mechanisms simultaneously.

2. The combination with a plurality of planting units, of traction driven seed planting mechanisms for each unit including dropping and releasing mechanism therefor, and electrically operated means for controlling the operation of all of said planting mechanisms.

3. The combination with a plurality of planting units, of individual seed planting mechanisms for each unit, clutch operated releasing mechanisms for each of said units, and an electrical circuit including a solenoid operatively connected to said clutch for simultaneously actuating the planting mechanisms of all of said units.

4. The combination with a plurality of planter units, of seed planting mechanisms carried by each unit, electrically operated means for releasing said planting mechanisms, and a check wire for operatively controlling said electrical means.

5. The combination with a plurality of individual planting units, of traction driven seed feeding and dropping mechanisms for each of said units, of releasing mechanism for each of said units, magnets operatively connected to said releasing mechanisms, and an electric circuit operatively connected to said magnets for simultaneously releasing said planting mechanisms.

6. The combination with a plurality of individual planting units, seed feeding and seed dropping mechanisms for each of said units, a releasing mechanism for each of said units, an electric circuit, a plurality of solenoids in said electric circuit and operatively connected to said releasing mechanism for simultaneously operating said planting mechanisms.

7. The combination with a plurality of individual planting units, of seed feeding and dropping mechanisms for each of said units, an electric circuit for all of said units, individual solenoids included in said circuit and operatively connected to said releasing mechanism, and a check wire adapted to effect a make and break in said circuit for actuating all of said planting mechanisms simultaneously.

8. The combination with a plurality of planter units arranged in sets, of seed feeding and planting mechanism for each planter unit, a clutch releasing mechanism for each set, and an electrically operated means for controlling said clutch mechanism whereby said planting mechanisms are all simultaneously actuated to plant said seed.

9. The combination with a plurality of individual planters arranged in sets, seed feeding and seed planting mechanisms for each individual planters, releasing mechanism for each set, a solenoid operatively connected to each releasing mechanism, and an electrical circuit including the solenoid of each set for releasing said releasing mechanism whereby said planting mechanisms may be simultaneously actuated to plant the seed.

10. The combination with a plurality of planter units, of seed planting mechanisms for each of said units including a seed plate and dropping mechanism, a press wheel for each unit for operatively driving said seed plate and dropping mechanism, a clutch interposed between said press wheel and seed plate and dropping mechanism, a solenoid operatively connected to said clutch and individual to each planting unit, an electrical circuit connecting said solenoids together, whereby all of said clutches are simultaneously controlled for instantaneously actuating said seed plate and said dropping mechanism of the individual planting units.

11. The combination with a plurality of individual planting units, of seed planting mechanisms for all of said units including seed plates and dropping mechanisms, press wheels for driving each of said planting units, a clutch for controlling the driving of said planting units, and electrically controlled means connected to all of said units for simultaneously controlling said clutches and effecting an instantaneous planting of all of said planting units.

12. The combination with a plurality of individual planting units, of planting mechanisms for each of said units including a seed hopper, seed plates and seed dropping mechanisms, a press wheel for each of said units for operatively driving said planting mechanisms, a clutch interposed between said press wheel and said planting mechanisms, a release mechanism for said clutch, a single electrical circuit for all of said planting units, an individual solenoid for each of said release mechanisms mounted in said circuit for controlling said clutch, whereby all of said planting mechanisms are simultaneously actuated to plant the seed.

13. The combination with a plurality of planter units, of seed planting mechanisms for each of said units including seed feeding and seed dropping mechanisms, a press wheel for driving said planting mechanisms, individual to each unit, a clutch mechanism interposed between said press wheel and said planting mechanism, a single electrical circuit for all of said planting mechanisms, a solenoid for each planting unit mounted in said circuit, a releasing mechanism operatively connected with said solenoids and to said clutch mechanism whereby all of said planting mechanisms are simultaneously actuated to plant the seed in transverse alignment with respect to each other.

JOHN C. BOHMKER.